United States Patent [19]

Ritz et al.

[11] 3,748,400

[45] July 24, 1973

[54] CIRCUIT ARRANGEMENT FOR ATTENUATION COMPENSATION IN TELECOMMUNICATION SUBSCRIBER STATIONS

[75] Inventors: Hermann Ritz; Hans Gorlitz; Anneliese Jendis, all of Munich, Germany

[73] Assignee: Siemens & Halske Aktiengesellschaft, Munich, Germany

[22] Filed: July 20, 1972

[21] Appl. No.: 273,536

Related U.S. Application Data

[63] Continuation of Ser. No. 26,536, April 8, 1970.

[30] Foreign Application Priority Data

Apr. 15, 1969 Germany.................. P 19 19 111.8

[52] U.S. Cl........ 179/81 B, 179/81 A, 179/170 NC

[51] Int. Cl. .......................................... H04m 1/00

[58] Field of Search .......... 179/81 A, 81 B, 170 NC

*Primary Examiner*—Ralph D. Blakeslee
*Attorney*—Harold J. Birch et al.

[57] ABSTRACT

The invention is related to a circuit arrangement for centrally supplied subscriber stations in telecommunication installations. In the inventive circuit the recieving amplifier is connected into a bridge circuit used for side-tone attenuation. The signal input of the receiving amplifier is located in the one diagonal of the bridge, and the output of the transmitter is located in the other diagonal of the bridge circuit. A variable resistance element is connected in parallel with the bridge diagonal across which the signal input to the receiving amplifier appears for compensating for the different attenuation affects of transmission lines having differing lengths.

7 Claims, 1 Drawing Figure

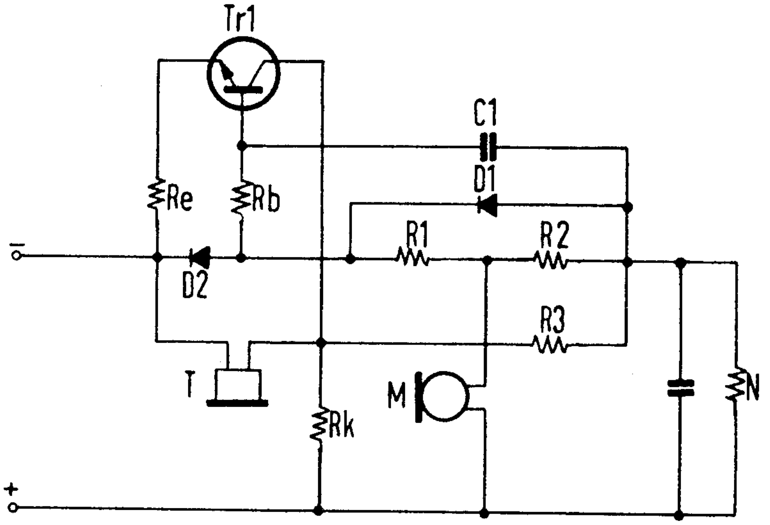
Tr1
C1
D1
Re
Rb
R1
R2
D2
R3
T
M
Rk
N

CIRCUIT ARRANGEMENT FOR ATTENUATION COMPENSATION IN TELECOMMUNICATION SUBSCRIBER STATIONS

This is a continuation of application Ser. No. 26,536, filed Apr. 8, 1970.

CROSS REFERENCE TO RELATED APPLICATIONS

Applicants claim priority from German Pat. application P 19 19 111.8 filed Apr. 15, 1969.

BACKGROUND OF THE INVENTION

As centrally supplied subscriber stations are connected with the exchange office over subscriber lines of different length, the problem of compensating for the different attentuations resulting from the different lengths of subscriber lines arises. A number of circuit arrangements directed to this problem have already been devised. For example, one known arrangement connects the amplifiers over voltage-dependent elements which act such that as the line length increases the supply voltage of the amplifiers, and thereby the amplification remains constant, or even increases. In this manner the different line attenuation of the connection line is compensated. The voltage-dependent elements have resistances which depend upon the feeding current, and therefore, the alternating current conditions of the circuit are changed. The side tone suppression of the circuit is therefore degraduated.

The arrangement which eliminated the detuning of the circuit is described in German Published Pat. No. 1,155,171. In this system the direct current voltage is decreased within the compensation circuit of the station by use of, for example, a resistor. A partial winding of the transmitter, is used in conjunction with a decoupling resistor to charge a capacitor. The charging voltage of the capacitor is conveyed as a control voltage to the speech-and/or audio amplifier of the station. Although this circuit arrangement does not suffer the problem of detuning, an input to the amplifiers for the purpose of conveying of the necessary control potential is necessary.

SUMMARY OF THE INVENTION

The present invention is directed to acircuit arrangement which achieves an attenuation compensation without detuning the subscriber line and without the need for additional control inputs to the existing amplifier. The circuit arrangement according to the invention includes a variable resistance which compensates for the different attenuation of telephone lines of different lengths. The variable resistance is connected in parallel with the diagonal of a bridge circuit to which the receiving amplifier is connected.

Because the variable resistance is parallel to two adjacent branches of the bridge, the bridge current ratio remains the same and the bridge circuit is not detuned. Additional inputs to the amplifier are not necessary because the inventive circuit arrangement does not require a control voltage to regulate the amplification.

The point of operation of the amplifier is retained, and only the input signal is changed as a function of the different lengths of the subscriber lines. Accordingly, the output signal of the receiving amplifier is independent of the length of the line. The inventive arrangement offers the additional advantage of enabling correction of the frequency response of the amplifier as it is influenced by the different lengths of the subscriber lines.

BRIEF DESCRIPTION OF THE DRAWINGS

The FIGURE shows a preferred embodiment of the invention.

DETAILED DESCRIPTION OF THE INVENTION

The speaking station circuit includes a telephone T, connected to a receiving amplifier, and a microphone M. A resistance bridge circuit is used for side tone suppression. The receiving amplifier is formed of transistor T*r*1, having an emitter resistor R*e*, a base resistor R*b* and a collector resistor R*k*. Transistor T*r*1 is operated in a common emitter connection, so that the input of the amplifier lies between the base and the emitter, and the output between the emitter and the collector. Telephone T is connected at the output of the amplifier. The direct current voltage supply of transistor T*r*1 is supplied across collector resistor R*k* by the positive potential on the subscriber line. The negative potential of the subscriber line is supplied to transistor T*r*1 over emitter resistor R*e*. A diode D2 is connected between the base resistor R*b* and the emitter resistor R*e* of transistor T*r*1. In the event of fluctuating direct current voltage on the subscriber connection line, or in the event of subscriber connection lines of different lengths diode D2 maintains the emitter base voltage of transistor T*r*1 approximately constant, so that the point of operation of the amplifier is retained.

One branch of the resistance bridge circuit consists of the resistance of the connected subscriber line and the other three branches respectively consist of the balancing network resistor N and the bridge resistors R1 and R2. For the purpose of better adaptation to the subscriber lines, which, as is known, posses capacitive transverse branch circuits, the balancing network consists of a parallel circuit of a resistor and a capacitor.

The variable resistance diode D1 is connected parallel to the adjacent branches of the bridge circuit, formed of resistors R1 and R2. The diode D1 is, therefore, parallel to the signal input of the receiving amplifier which is located in one diagonal of the bridge circuit. It will be noted that capacitor C1 is interposed between the junction of diode D1 with resistor R2 and the base of transistor T*r*1 for direct current decoupling, so that variations in the resistance of diode D1 will not affect the operating point of the transistor. For reasons of simplification only one diode is shown in the drawing. In practical cases a series connection of several diodes is used to realize this changeable resistor.

In the case of long subscriber lines, the feeding current is low and variable resistance diode D1 presents a high alternating current resistance. In the case of short lines and the feeding current is high and variable resistance diode D1 presents a low alternating current resistance. As the alternating current input signal reaches the base of transistor T*r*1, over balancing network N and capacitor C1, in the case of a short line and low alternating current resistance of diode D1, for example, this alternating current input signal is shunted over diode D1, and a lower signal reaches the input of the amplifier, the output signal is, therefore, correspondingly smaller. In the case of a long line and higher resistance of diode D1 the input signal is shunted less, so that although the input signal was decreased because of the line attenuation, the output signal is of the same magnitude as in the case of a short line.

The base and collector of the receiving amplifier transistor T*r*1 are counter-coupled through resistor R3. This counter-coupling or negative feedback is controlled, in the same manner as the input signal by the variable resistance diode D1 as a function of the length of the connected subscriber line. Accordingly, the inner resistance of the amplifier, which is dependent upon the counter-coupling, is also changed as a function of the subscriber line length. For a short line the counter-coupling is less and the inner resistance higher than in the case of a long line. This characteristic is utilized to correct the frequency response of the amplifier when a capacitive transducer is used in the receiving circuit.

The inter-action of the inner resistance of the amplifier, which is dependent on the length of the line, with the capacitive apparent resistance of the transducer counter-acts the frequency response of the subscriber line. Thus, for example, the drop in the level occuring in the case of a long subscriber line, is cancelled by the above-mentioned inter-action. Therefore, a frequency response which is independent of the length of the subscriber line is achieved.

We claim:

1. In a circuit arrangement for centrally supplied telecommuni-cation subscriber stations having a bridge circuit for side tone suppression wherein a receiver amplifier receives its input across one diagonal of said bridge circuit, the subscriber station transmitter being connected across the other diagonal of said bridge circuit, an improvement comprising:

variable resistance means for compensating for the different attenuation effects of transmission lines of different lengths, said variable resistance means being connected in parallel with said one diagonal of said bridge circuit in such a manner that the frequency characteristic of said bridge circuit is not altered with variation of said variable resistance means and in such a manner that the operating point of said receiving amplifier is not altered with variation of said variable resistance means.

. The circuit arrangement of claim 1 wherein said variable resistance means is direct current coupled to said one diagonal of said bridge circuit and wherein direct current decoupling means is inserted between said variable resistance means and the input to said receiving amplifier.

3. The circuit arrangement of claim 1 further comprising means for varying the internal resistance of said amplifier in correspondence with variations of said variable resistance means so that the frequency response of said amplifier is held substantially constant.

4. The circuit arrangement of claim 3 wherein said subscriber station receiving circuit includes a capacitive transducer.

5. The circuit arrangement of claim 1 wherein said variable resistance means is a diode.

6. The circuit arrangement of claim 1 further comprising means for maintaining the supply voltage from the subscriber line applied to said receiving amplifier at a constant value despite fluctuations in said supply voltage.

7. The circuit arrangement of claim 6 wherein said means for maintaining is an additional diode.

* * * * *